United States Patent [19]

Hill

[11] Patent Number: 5,730,108

[45] Date of Patent: Mar. 24, 1998

[54] FUEL INJECTED COMBUSTION ENGINE

[75] Inventor: Raymond John Hill, Beldon, Australia

[73] Assignee: Orbital Engine Company (Australia) Pty. Limited, Balcatta, Australia

[21] Appl. No.: 662,637

[22] Filed: Jun. 14, 1996

[30] Foreign Application Priority Data

Jun. 15, 1995 [AU] Australia ............... PN 3585

[51] Int. Cl.$^6$ ............... F02B 13/10; F02M 67/00; F02M 67/10

[52] U.S. Cl. ............... 123/531

[58] Field of Search ............... 123/531, 532, 123/533, 534, 535

[56] References Cited

U.S. PATENT DOCUMENTS

| | | | |
|---|---|---|---|
| 4,934,329 | 6/1990 | Lear et al. | 123/531 |
| 5,115,786 | 5/1992 | Yamada | 123/531 |
| 5,239,970 | 8/1993 | Kurihara | 123/533 |

FOREIGN PATENT DOCUMENTS

| | | | |
|---|---|---|---|
| 0 412 075 | 7/1990 | European Pat. Off. | |
| 2-99760 | 4/1990 | Japan | 123/533 |
| 2-233868 | 9/1990 | Japan | |
| 93/08393 | 4/1993 | WIPO | |
| 94/25742 | 11/1994 | WIPO | |

OTHER PUBLICATIONS

"Patent Abstracts of Japan", vol. 15, No. 468 (M1184), abstract of JP-3-199666, Nov. 1991.

"Patent Abstracts of Japan", vol. 16, No. 141 (M1232), abstract of JP-4-1466, Apr. 1992.

*Primary Examiner*—Tony M. Argenbright
*Attorney, Agent, or Firm*—Nikaido, Marmelstein, Murray & Oram LLP

[57] ABSTRACT

A direct injected internal combustion engine includes a fuel injector associated with a combustion chamber; a fuel metering device to meter fuel for delivery by the fuel injector; and a gas supply in communication with the fuel injector such that the fuel is delivered from the fuel injector to the combustion chamber entrained in a gas. The gas supply is vented to atmosphere or a combustion chamber of the engine in response to sensing of an engine operating condition indicating imminent cessation of operation of the engine. Venting may be achieved, for example, by maintaining the fuel injector open or in communication with the combustion chamber prior to the stopping of the engine on sensing of the engine operating condition which may be reduction of engine speed below a predetermined value or activation of a "stop" switch.

26 Claims, 6 Drawing Sheets

Normal Mode

Discharge Mode

FUEL INJECTED COMBUSTION ENGINE

This invention relates to a fuel injected internal combustion engine wherein individual metered quantities of fuel are injected for use by respective cylinder(s) of the engine. More particularly, the invention is directed to such engines wherein the fuel is injected entrained in a gas, typically air.

Engines of the above type are known and typically incorporate a reservoir or an accumulator for the gas used in the injection process wherein the gas, at an appropriate pressure, is held and delivered to the respective injector(s) of the engine to carry out the injection process. In multi-cylinder engines of the above type, it has been suggested in prior patent applications to provide a plenum chamber in direct communication with each of the injector units as the source of compressed gas therefor. Alternatively, an individual plenum chamber or gas reservoir may be provided for each cylinder of the engine as described in the applicant's co-pending Australian Patent Application No. 65608/94 which corresponds to U.S. Pat. No. 5,622,155.

It has been found in some arrangements of fuel injection systems that, where the gas for use in entraining the metered quantities of fuel for injection is at a high pressure, that is, a pressure higher than the pressure of the fuel in the fuel metering and supply circuit, there may arise a problem wherein the gas pressure causes fuel to be forced back into the fuel metering and supply circuit. This problem may be made worse by typically imperfect seals at any valves or fittings in the fuel delivery lines. Accordingly, an engine may require to be cranked several times on a subsequent staff-up following a period of non-use in order that the fuel delivery lines may be primed before sufficient fuel is able to be metered for satisfactory running of the engine. Such repeated cranking is undesirable from the point of view of the operator of an engine who generally desires to achieve immediate engine start-up. It is however to be noted that under normal running conditions, small leakages due to the pressure differential between the gas and fuel typically have no significant effect on engine operation.

While attempts have been made to address these problems, they are either energy inefficient, potentially result in damage to the engine or partly ineffectual.

It is the object of the present invention to provide an internal combustion engine that is substantially free of the above discussed problems.

With this object in view, the present invention provides an internal combustion engine having at least one combustion chamber; a fuel injector means associated with the or each combustion chamber; fuel metering means to meter fuel through a fuel supply means for delivery by the or each fuel injector means; gas supply means in communication with said fuel supply means whereby fuel is delivered entrained in the gas; and pressure reduction means to reduce the pressure at said fuel supply means operable in response to at least one predetermined engine operating condition indicating imminent cessation of engine operation.

More particularly, the present invention provides an internal combustion engine having at least one combustion chamber, a fuel injector means associated with the or each combustion chamber; fuel metering means to meter fuel for delivery by the or each fuel injector means; gas supply means in communication with the or each fuel injector means to supply gas thereto whereby fuel is delivered from the or each fuel injector means entrained in the gas and pressure reduction means to reduce the pressure in said gas supply means prior to the stopping of the engine operable in response to at least one predetermined engine operating condition indicating imminent cessation of engine operation.

A condition indicating imminent cessation of operation of the engine may, more specifically, be a stop switch, or an ignition switch wherein, the switching of an ignition key from an "on" to an "off" position indicates the end of engine operation. Typically, an engine rotates several revolutions following stop switch activation prior to coming to a complete stop. During this time, discharge to a lower gas pressure is possible by appropriately setting the timings of opening of the or each fuel injector means to enable gas discharge from the gas supply means during engine run-down. Gas discharge may occur over several cycles of the engine prior to the engine coming to a complete stop. Further, by achieving gas discharge from the gas supply means while the crankshaft is still rotating, the need for a secondary power source, such as a battery, to operate the or each fuel injector means arts; the engine has come to a complete stop, may be avoided.

Conveniently, the engine may be a direct injected engine wherein the or each fuel injector means may open directly into a respective combustion chamber. However, it is to be noted that the invention be equally applicable to manifold injected engines.

Conveniently, or alternatively, the predetermined engine operating condition may be engine speed. In response to, for example, the detected engine speed falling below a predetermined value, which may indicate that operation of the engine may very shortly cease, an Electronic Control Unit (ECU) of the engine may demand, for example, opening of a pressure reduction means being a valve communicating with the gas supply means with a discharge zone of lower pressure to enable the discharge of gas from the gas supply means thereby reducing the pressure therein.

The gas supply means may conveniently be the gas supply duct in a fuel/gas rail. Alternatively, the gas supply means may be an individual gas reservoir or plenum associated With each combustion chamber. Any form of gas supply means is, however, considered to be within the scope of the disclosure.

It is to be noted that it is not strictly necessary to evacuate the gas supply means entirely because the object of the invention is to reduce the tendency for the formation of a differential pressure or pressure gradient causing fuel to be forced back into or towards the fuel metering means. Therefore, even a partial evacuation of gas from the gas supply means will provide some advantage. However, optimally and advantageously, the pressure in the gas supply means will be, as closely as practicable, equalised with the pressure in the fuel motoring means, thereby eliminating any pressure differential that would tend to cause fuel flow back into the fuel supply circuit including the fuel metering means. Ideally, the pressure in the gas supply means would be reduced to atmospheric pressure.

The means to reduce the gas pressure in the gas supply means may be a valve which is solenoid actuated. Conveniently, gas may be discharged through a nozzle of the or each fuel injector means which may conveniently be a solenoid actuated poppet or pintle type injection valve. An alternative may be to discharge gas through a further valve means provided, for example, in the gas supply duct of a fuel/gas rail or in an individual gas reservoir or plenum associated with an individual cylinder.

Conveniently, discharge of gas from the gas supply means will occur when the pressure of the gas in the gas supply means is greater than that in the crankcase or combustion chamber of the engine. Typically, when the injector nozzle is used as the discharge valve, this condition occurs within approximately 90° each side of the Bottom Dead Centre (BDC) position of the piston. Opening of the exhaust port enhances gas discharge characteristics still further. On a two-stroke cycle engine, the exhaust pod typically opens at 100° either side of the Top Dead Centre (TDO) position of the piston.

Venting to atmosphere is an option for the discharge of gas from the gas supply means, but may not be favoured for environmental reasons. It is to be observed, in this regard, that the gas supply means may contain gas laden with fuel droplets. A modification would enable this gas to be supplied to a fuel/gas separator, for example a carbon or adsorbent canister which may be a canister utilised to adsorb fuel vapours escaping from the fuel tank. Therefore, upon detection of the predetermined engine operating condition, gas from the gas supply means may be directed to the separator, with fuel being removed therein. The remaining gas may then, if desired, be directed to the engine gas intake system. Fuel may be purged from the separator in a manner as described in the applicant's Australian Patent No. 641223, the contents of which are hereby incorporated by reference.

In a further embodiment, the gas supply means may be a compressed gee supply constructed and arranged to contribute to the effective performance of the injection system and consequently of the engine and to not substantially increase the external physical dimensions of the engine. In this embodiment, such as is described in the applicant's co-pending Australian Patent Application No. 65608/94 (corresponding to U.S. Pat. No. 5,622,155), the contents of which are hereby incorporated by reference, the gas supply means may take the form of a gas chamber means arranged adjacent a combustion chamber of the engine, laterally spaced from a nozzle chamber of the fuel injector means and in communication therewith to supply gas to the nozzle chamber. Preferably, the gas chamber means and/or the nozzle chamber are located within a cylinder head of the engine, and when both are so located, the gas chamber means and the nozzle chamber are preferably located adjacent one another. Normally, the gas chamber means is in direct communication with the nozzle chamber. Alternatively, the gas chamber means may be located elsewhere in the wall of the combustion chamber.

During engine operation, a nozzle of the nozzle chamber is opened or held open for a period of time after completion of fuel delivery from the nozzle chamber to the combustion chamber. This permits gas from the combustion chamber to pass through the nozzle chamber to raise the gas pressure in the gas chamber means to a level sufficient to effect fuel delivery during the next engine operating cycle. As alluded to hereinbefore, this gas pressure may, due to the existence of a lower pressure in the fuel metering and supply circuit, cause a reverse flow of fuel in the fuel metering and supply circuit, particularly after engine shut-down. Therefore, when an engine operating condition, such as imminent engine cessation, as determined for example by the activation of a stop switch or by the engine speed falling below a predetermined value, is detected, the nozzle may be opened during engine run-down at an appropriate time in the cylinder cycle to thereby reduce the gas pressure in the gas chamber means to a value substantially equal to the pressure in the fuel metering and supply circuit. Alternatively, a valve allowing discharge of gas from the gas chamber means may be specifically provided, thus avoiding discharge of gas through the nozzle chamber and hence the combustion chamber. By this means, the reverse flow of fuel and incidence of gas locks in the fuel metering and supply circuit, following engine shut-down, may be reduced or avoided.

Where gas from the combustion chamber is utilised to raise the pressure in the gas chamber means, the high temperature of the gas may be of assistance in controlling the formation of deposits in the gas chamber means and nozzle chamber, and also in achieving stability of engine operation, particularly under idle conditions. Water ingress experienced with conventional compression equipment may also be avoided, thus avoiding the concomitant risk of corrosion and the need (or complex water removal devices.

In a yet further embodiment, the present invention provides a, method for reducing pressure in a gas supply means of an internal combustion engine comprising at least one combustion engine comprising at least one combustion chamber; a fuel injector means associated with the or each combustion chamber fuel metering means to meter fuel through a fuel supply means for delivery by the or each fuel injector means; the gas supply means being in communication with said fuel supply means whereby fuel is delivered entrained in the gas; and pressure reduction means to reduced the pressure reduction means to reduce the pressure at said fuel supply means being operated in response to at least one predetermined engine operating condition indicating cessation of engine operation.

More particularly, the present invention provides a method for reducing pressure in a gas supply means of an internal combustion engine comprising at least one combustion chamber; a fuel injector means associated with the or each combustion chamber; fuel metering means to meter fuel for delivery by the or each fuel injector means; the gas supply means being in communication with the or each fuel injector means whereby fuel is delivered from the or each fuel injector means entrained in the gas; and pressure reduction means to reduce the pressure in said gas supply means prior to the stopping of the engine being operated in response to at least one predetermined engine operating condition indicating imminent cessation of engine operation.

The pressure of the gas in the gas supply means may be reduced until the pressure differential or gradient which may cause fuel/gas to flow back into the fuel-supply system is satisfactorily reduced, following which a nozzle of the fuel injector may be closed, that is, if the fuel injector is employed also as a pressure reduction means.

The invention will now be described in more detail with reference to the accompanying drawings which illustrate two practical arrangements of an engine cylinder head incorporating a fuel injector means and gas chamber means in which the present invention is practiced.

A short description of each of the drawings is as follows.

Figure 1:
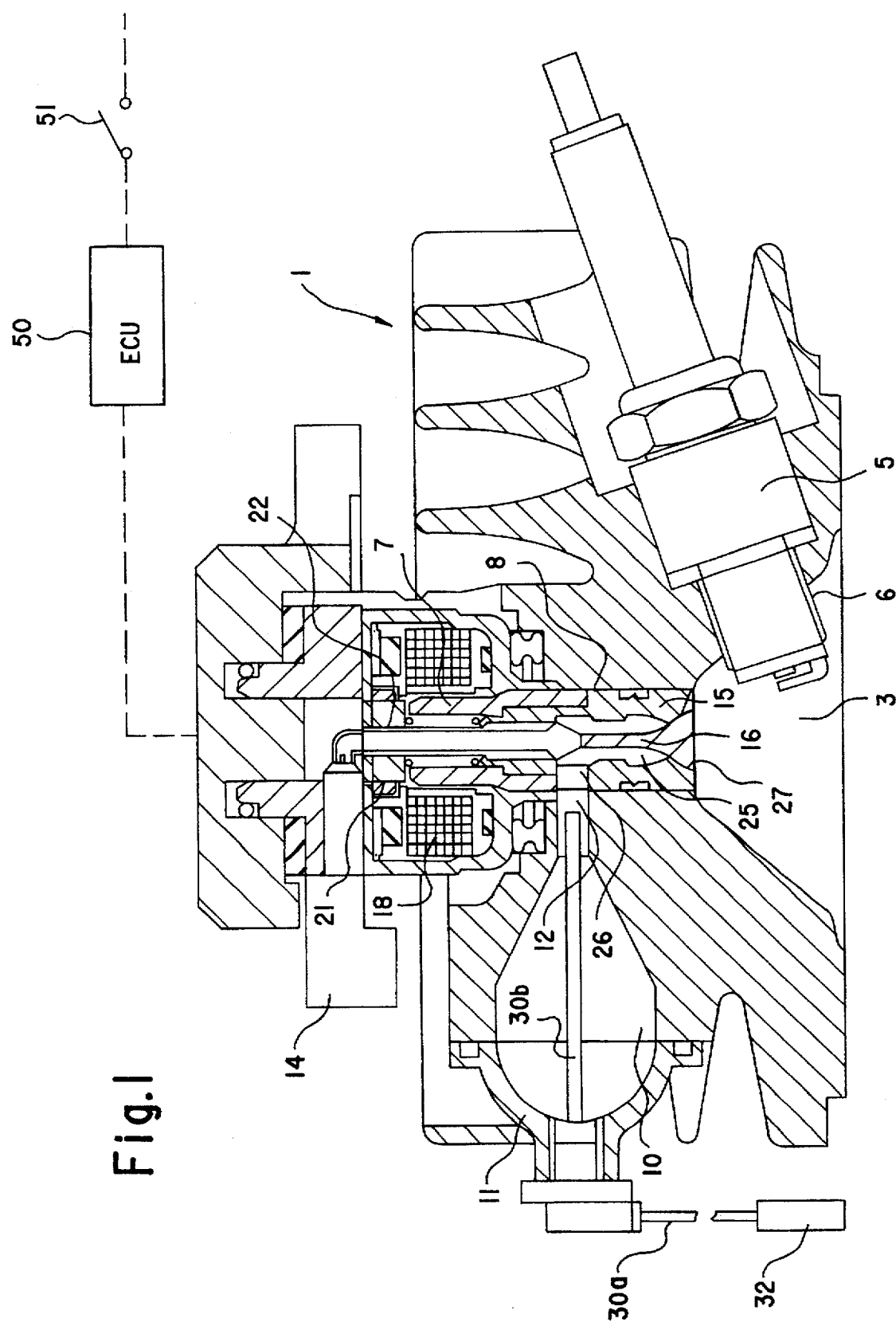
FIG. 1 is a cross-sectional view of a cylinder head incorporating a fuel injector means and gas chamber means.
Figure 4:
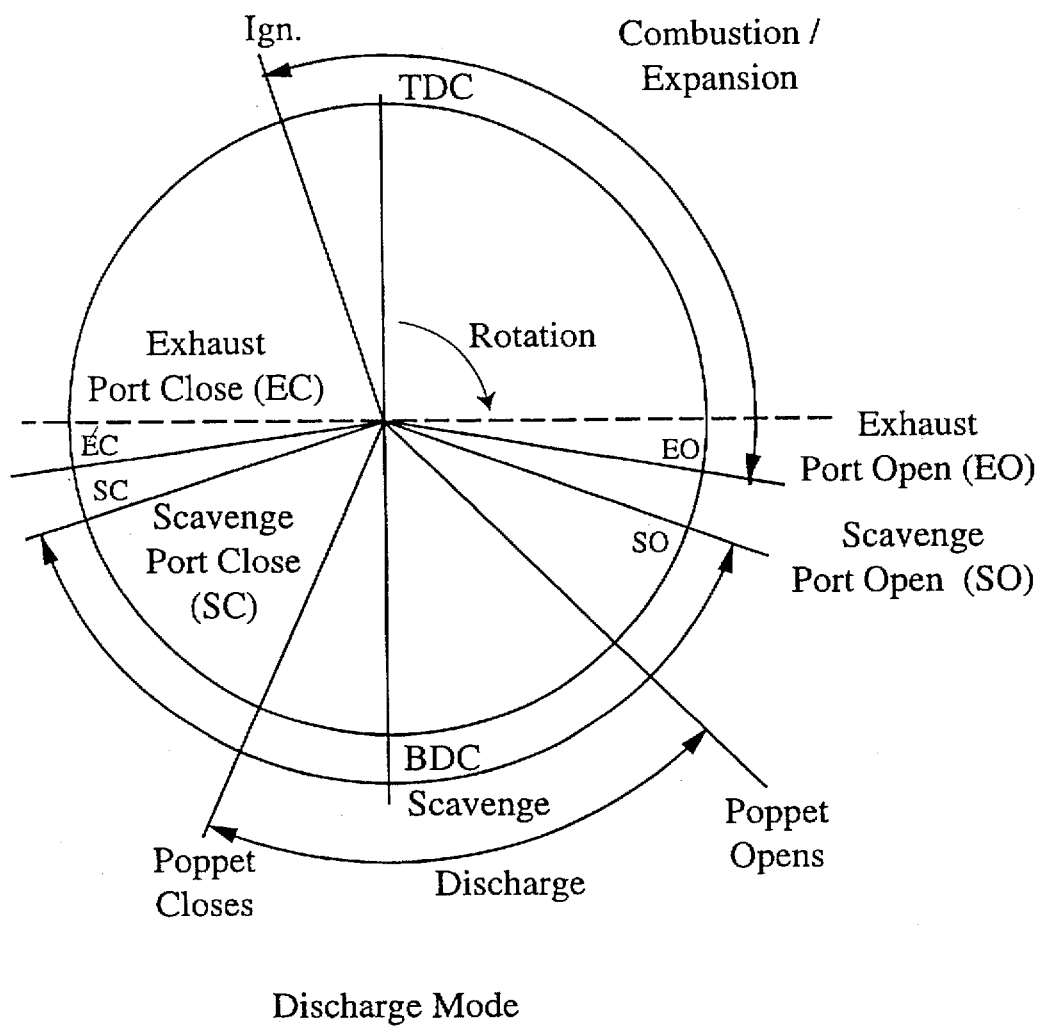
FIG. 4 is a diagram showing graphically the events that occur during an engine cycle immediately preceding shut-down in a two-stroke cycle engine when employing the method of the present invention.
Figure 6:
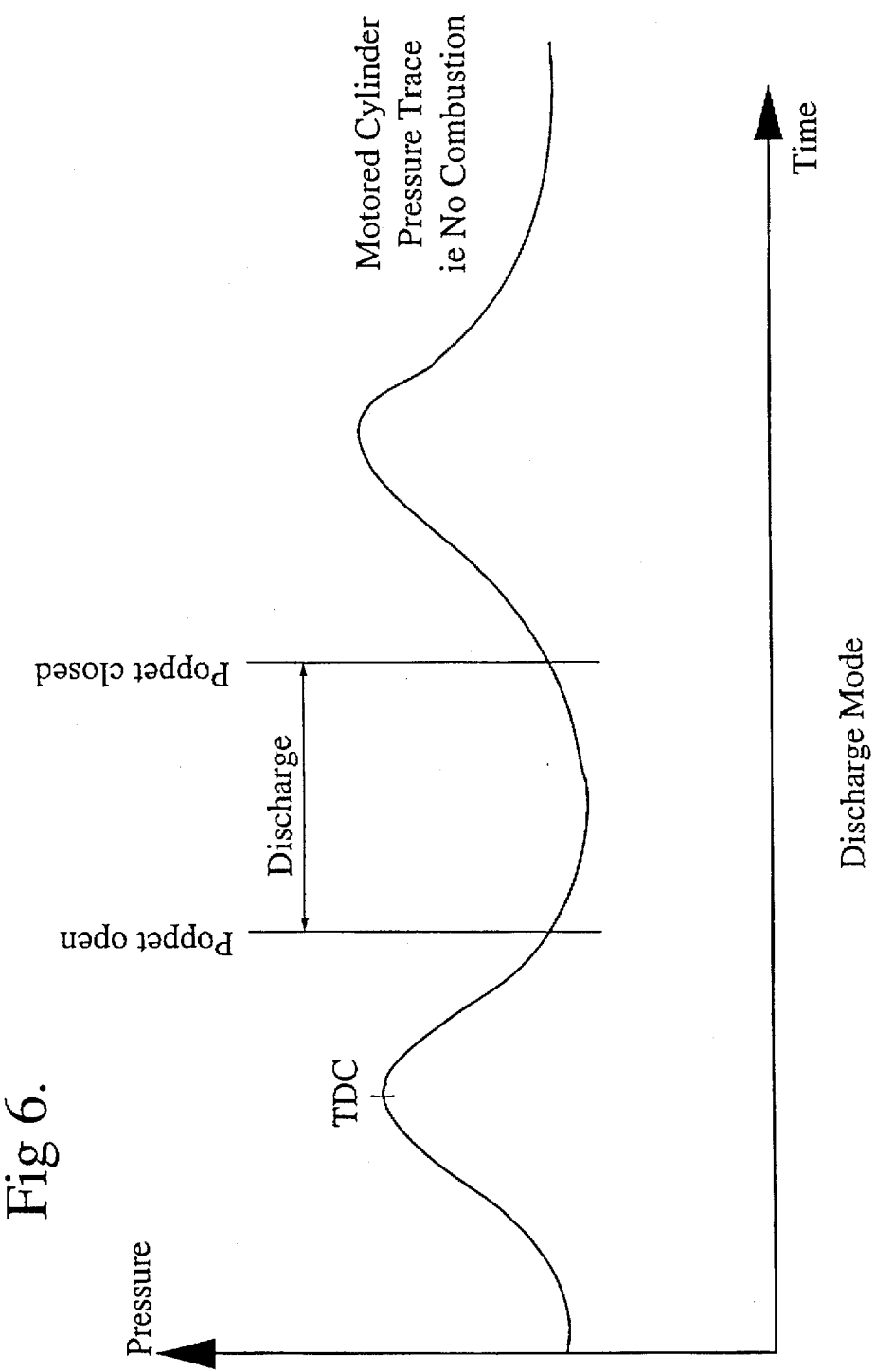

FIG. 6 is a diagram showing a pressure-time characteristic of the engine corresponding to the cycle illustrated in FIG. 4; and Referring now to FIG. 1, there is shown an engine cylinder head 1. The engine cylinder head 1 is suitable for a conventional two-stroke cycle engine, especially en engine which is direct-injected and which may, for example, by used in a marine or motorcycle application. Further, the cross-section as shown can be considered as representing a single cylinder of a multi-cylinder engine or s single cylinder engine.

A conventional spark plug 5 is removably screwed into a suitably located threaded passage 6 to project into a combustion chamber 3. A two fluid fuel injector 7 of known construction is located in a bore 8 in the cylinder head 1 to project into the combustion chamber 3 in a known manner, A gas chamber 10 is partly formed within the cylinder head 1 and in a detachable cover plate 11. The gas chamber 10 is in continuous communication with the fuel injector 7 by way of a passage 12.

The fuel injector 7 includes a nozzle 15 received in the bore 8 in the cylinder head 1 and a poppet valve 16 controlled by a solenoid unit 18 having an armature 21 attached to a stem 22 of the valve 16. The solenoid 18 is cyclically energised in the known manner to open and close the valve 16 for the delivery of fuel entrained in air to the combustion chamber 3. The nozzle 15, of the fuel injector 7, has a laterally disposed aperture 26, located to provide communication between the passage 12 and an annular cavity 25 surrounding a lower end of the valve 16 which is in direct communication with an upstream side of a valve head 27 of the valve 16. It is thus seen that there is a continuous free communication between the gas chamber 10 in the cylinder head 1 and the annular cavity 25 in the fuel injector 7. A fuel metering unit 32 which in one form may be a positive displacement pump, although other types of metering unit are possible, is arranged to cyclically deliver metered quantities of fuel through a fuel line 30A and needle 30B into the throat of the passage 12 and hence through the aperture 26 and into the annular cavity 25 about the exterior of the lower end of the valve 16. The length and direction of the needle 30B can be varied or adjusted to achieve the best operational position thereof relative to the gas chamber 10 and the passage 12. Also, the needle 30B can extend through the passage 12 and/or the aperture 26 to deliver the fuel directly into the annular cavity 25. Further, the needle 30B can extend into the cavity 25 and may be configured at the end thereof so as to direct fuel towards the valve head 27.

In the operation of an engine using the arrangement as above described it is to be understood that the delivery of a metered quantity of fuel from the metering unit 32 through the needle 30B may be a separate operation from the opening of the nozzle 15 for the delivery of fuel entrained in a charge of pressurised gas from the gas chamber 10 through the nozzle 15 to the engine combustion chamber 3. Assuming a starting position, wherein the gas chamber 10 is charged with gas previously received from the engine combustion chamber 3, a piston (not shown) of an associated cylinder (not shown) corresponding with the combustion chamber 3 will be moving upwardly on a compression stroke of the engine, end a metered quantity of fuel will have previously been delivered by the metering unit 32 into the throat of the passage 12 and hence the annular cavity 25. Consequently, upon opening of the nozzle 15 at a point in the compression stroke when the cylinder pressure is substantially below the pressure of the gas in the gas chamber 10, the metered quantity of fuel will be discharged through the nozzle 15 into the combustion chamber 3. The fuel is delivered entrained in gas which will flow from the gas chamber 10 through the passage 12 and aperture 26 into the fuel injector 7 and hence, through the annular cavity 25 and out through the open nozzle 15.

After a relatively short interval of time, all of the metered quantity of fuel will have been discharged through the nozzle 15 into the combustion chamber 3, and the continuing upward movement of the piston in the cylinder will provide a resultant rising pressure in the combustion chamber 3. At this point in time, the nozzle 15 is still maintained open to facilitate the subsequent repressurisation of the gas chamber 10. In this regard, a condition will be reached where the pressure in the combustion chamber 3 is greater than that in the gas chamber 10, and there will be a reverse flow of gas from the combustion chamber 3 through the open nozzle 15, aperture 26 and passage 12 into the gas chamber 10 to replace the gas discharged during the previous delivery of the fuel. As a consequence, the pressure of the gas in the gas chamber 10 is raised to a level substantially above the pressure in the combustion chamber 3 at the time of initial opening of the nozzle 15 to effect subsequent delivery of the fuel to the combustion chamber 3. The nozzle 15 is then closed to retain the gas in the gas chamber 10 which is then in condition to effect delivery of fuel into the combustion chamber 3 during the next engine cycle.

It will be appreciated that the capacity of the gas in the gas chamber 10 to effect delivery of fuel to the combustion chamber 3 arises directly from the pressurised condition of the gas in gas chamber 10. Therefore, during running of the engine, gas retention in gas chamber 10 is both desirable and effective and the cost or need for a compressor dedicated to the end of supplying air or gas to effect delivery of fuel is eliminated.

Figure 3:
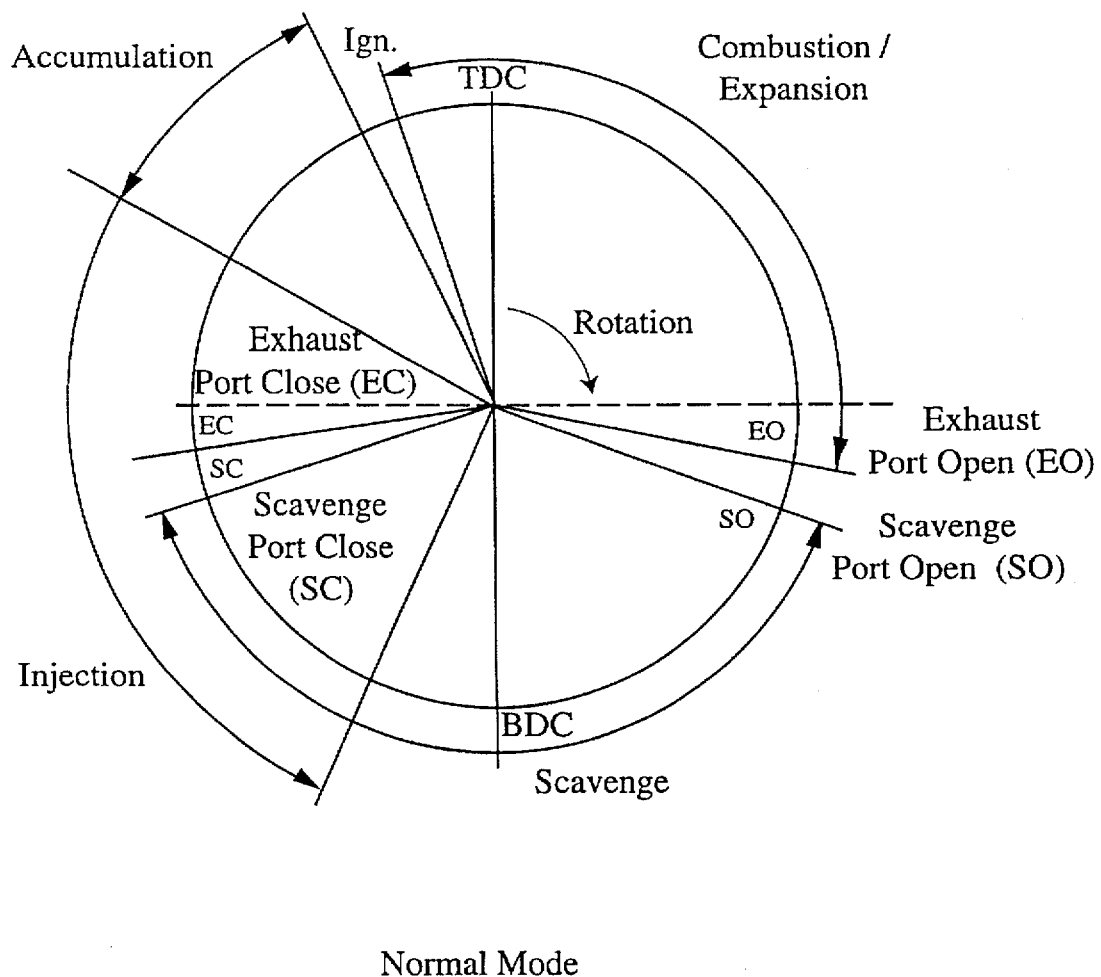
FIG. 3 is a diagram showing graphically the events that occur during an engine cycle of a two-stroke cycle engine under normal operating conditions.

However, when the engine is stopped, if the gas chamber 10 contains therein gas at a high pressure, a pressure differential may exist between the pressure of the gas in the gas chamber 10 and the pressure of the fuel in the fuel metering unit 32 and the associated fuel supply lines such as the line 30A and needle 30B, This pressure differential may tend to cause fuel to flow backwards through the needle 30B, line 30A and fuel metering unit 32 such that gas from the pressurised gas chamber means 10 subsequently fills these volumes. Typically, a valve or valves within the metering unit 32 and the respective fittings between the metering unit 32, line 30A and needle 32 do not seal perfectly against reverse flow of gas or fuel therethrough induced by the back-pressure caused by retention of pressurised gas within the gas chamber 10 on engine shut-down. Thus, gas locks can form within the metering unit 32 causing the difficulties on start-up of the engine which are described hereinbefore. More particularly, significant priming of the fuel supply lines will typically be required before sufficient metered quantities of fuel can be supplied to the engine to enable the starting and subsequent satisfactory operation thereof.

it will be understood that the fuel metering unit 32 is typically under the control of an Electronic Control Unit (EOU) programmed appropriately to determine the appropriate quantity of fuel to be delivered under specified engine load and speed conditions. The ECU also appropriately controls the duration of opening of the nozzle 15 to deliver fuel and allow accumulation of gets in gas chamber 10, under specific engine lead and speed conditions, as illustrated generally by the cycle shown in FIG. 3.

Therefore, in accordance with the present invention, the ECU may be programmed to enable opening of nozzle 15, or any other valve, such that gas is discharged from gas chamber 10 and the fuel injection system shortly after, or most advantageously prior to, stopping of the engine to prevent the back-pressure problem described above.

Discharge of the gas from gas chamber 10 is preferably achieved by the opening of the nozzle 15 at a time when the pressure in the combustion chamber 3 is less than the pressure in the gas chamber 10 and is decreasing as a function of crank angle. This will tend to maximize the possible duration of the discharge event. This will ordinarily occur when the platen is travelling towards the BDC position and, ideally, when the exhaust pod of the cylinder is either partially or fully open, The manner in which this occurs is illustrated generally by the cycle shown in FIG. 4.

In a preferred case, the discharge of gas from the fuel injection system and, in particular, gas chamber 10, may occur by opening of the fuel injector nozzle 15 in response to a predetermined engine operating condition. For example, activation of a stop switch by an operator of the engine could constitute this condition. In this regard, advantage is taken of the phenomenon that several engine cycles ordinarily follow activation of the stop switch. In such a case, the nozzle 15 will open in accordance With a valve opening instruction received from the ECU in response to flagging of a condition that the stop switch has been activated. Gas is accordingly discharged from gas chamber 10 through open nozzle 15 whilst the engine runs down to a complete stop. However, this ease does not take account of various factors such as the presence of fuel in the injection system at activation of the stop switch which may itself cause a difficulty through flooding of the engine with fuel during stopping. Accordingly, fuel may be initially stopped, or bypassed to a return line to a fuel tank, with the nozzle 15 being opened, preferably during the latter "slowing" engine cycles, to enable discharge of gas from the fuel injection system and gas chamber 10 in particular. The valve 16 may then be left open, though this may be undesirable. For example, it is known that water may migrate into the fuel injection system and, by capillary action, through valves in the fuel metering unit 29, into the fuel metering and supply system where its presence may have undesirable results including compounding of the difficulty of starting the engine and corrosion of parts within the fuel metering and injecting system. Thus closure of valve 16 following satisfactory differential pressure reduction is preferred.

Therefore, in a desirable final step, the nozzle 15 is ideally closed, after discharge of gas from the fuel injection system and gas chamber 10 thereby achieving insurance against the aforesaid problems provided that the engine has come to a complete stop. The ECU may enable this to occur in a number of ways. For example, the EOU can be programmed with a typical number of engine cycles from activation of the stop switch end this number of cycles can be made dependent upon engine speed and load at stop switch activation and/or other factors. Thus, the activation of the stop switch may enable a counter for the number of engine cycles until complete cessation of engine operation. In this way, the above operations of stopping fuel, opening nozzle 15, and closing nozzle 15 may be accomplished within the programmed number of engine cycles. In this way too, the need for a secondary power source, such as a battery, to enable opening and dosing of vane 16 after the engine has come to a complete stop may be avoided, though it is to be understood that the use of such a secondary power source is comprehended by the present invention.

Further, the discharge of gas from the fuel injection system need not be made dependent upon activation of the stop switch. It is to be considered that there are other operating conditions for the engine in which gas discharge may be desirable. For example, discharge of gas by opening of a pressure reduction means, for example, nozzle 15 may be made dependent upon the engine speed falling below a predetermined threshold value in the absence of a stop switch being activated. The predetermined engine speed threshold value may be set as desired end may be set in particular to accord with a speed or speed range normally encountered during cessation of operation of the engine. In this way, an engine condition such as stalling may be provided for using the method of the invention. Engine speed may be sensed in a conventional manner, with sensed speed being input to the ECU, using an engine speed sensor known to those skilled in the art. It is to be noted that opening nozzle 15 and reducing the gas pressure upon stalling of the engine will not be a problem if the stalling was unintentional or the operator desires to start the engine immediately thereafter as the gas chamber means 10 is rapidly pressurised upon engine start-up, typically within one engine cycle.

It may be observed that dependence of the gas discharge routine on engine speed may provide a longer duration in which to accomplish the operations described above with respect to stop switch activation and detection. This is because depending upon the selected threshold engine speed level, a greater number of engine revolutions may occur prior to the engine coming to a complete stop than would be the case if the routine were made dependent upon stop switch activation.

Gas may also be discharged for a predetermined time or number of engine cycles following sensing of a condition at which operation of a pressure reduction means is required.

The ECU can be used to further tailor the conditions under which gas discharge is initiated. For example, gas discharge, though ordinarily accomplished in a single step, may be achieved in several steps. By way of illustration, as discussed above, it is most effective if gas discharge through opening of nozzle 15 takes place in the region, say 90° either side of the BDC position of a piston in an engine cylinder, which overlaps with the opening of the exhaust port. Further, several engine cycles may follow activation of the stop switch or engine speed falling below the predetermined threshold value. Accordingly, it may be better, and possibly necessary, to set the ECU such that the nozzle 15 only opens to enable gas discharge at a time when the position of the piston in the cylinder is proximate the piston BDC position or within 90° either side of this position. In such a manner, the pressure of gas in gas chamber 10 and the fuel injection system is reduced in a number of stages, but more efficiently insofar as repressurisation of the gas chamber 10 and fuel injection and metering system is avoided. In any case, the differential pressure is reduced to an acceptable value before the nozzle 15, in this case, is deactivated (closed) on complete stopping of the engine.

FIG. 6 Illustrates a pressure-time graph indicating events related to the discharge of gas from an engine in a "discharge" mode occurring in the region of BDC of the piston. Timings of opening and closing of nozzle 15 may be selected to achieve maximum gas discharge duration. The nozzle 15 is closed at the end of this duration and the cycle repeats itself when the piston again reaches the region of BDC of the piston.

Figure 5:
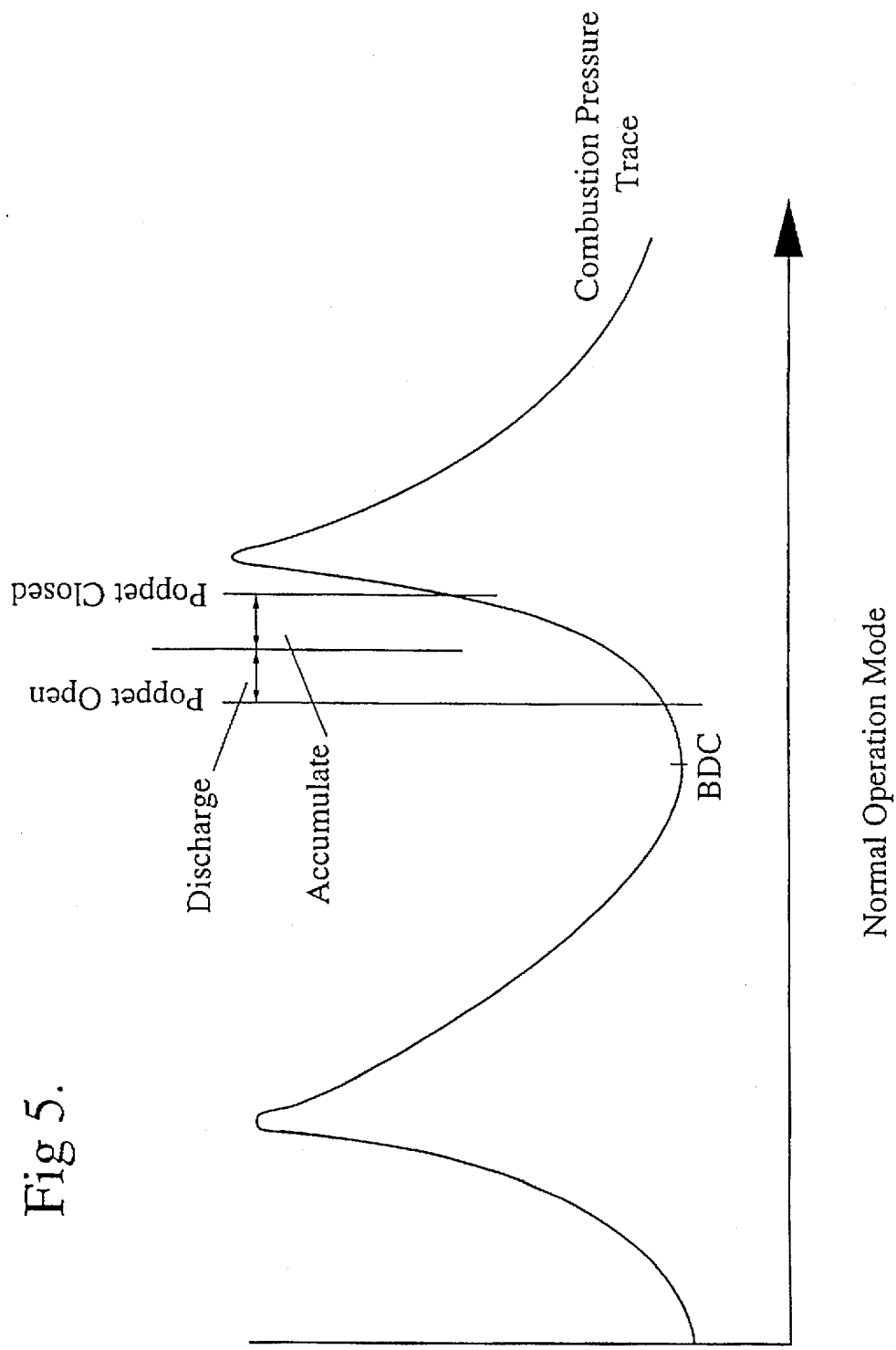
FIG. 5 is a diagram showing a pressure-time characteristic of the engine corresponding to the cycle illustrated in FIG. 3.

The duration of opening of nozzle 15 for discharge of gas in discharge mode may be contrasted with the significantly shorter duration of opening of nozzle 15 during a fuel injection event, as illustrated in FIG. 5. It is to be noted that the accumulation of gas (in gas chamber 10) phase does not occur when the engine is in discharge mode because nozzle 15 is deliberately closed to prevent build-up of pressure in the combustion chamber 3, corresponding to travel of the piston towards its TDC position, causing repressurisation of the gas chamber 10.

It is not to be understood from the foregoing that gas pressure discharge occurs in relation only to sensed piston position. Crankcase or combustion chamber pressure could be monitored independently, together with the pressure in the fuel injection system. Nozzle 15 would then open when the differential pressure exceeds a preselected value, for example, a certain proportion of maximum differential pressure.

Further, it is not to be understood that gas discharge occurs only through nozzle 15. This is not essential. Indeed, a problem that may arise is the formation of carbonaceous deposits around the nozzle opening due to fuel hang up when the nozzle 15 is open. Such deposits may hinder effective operation of the fuel injector 7, particularly when the engine is still at low temperature shortly after start-up. At this time, the carbonaceous deposits may remain uncombusted. Hence, use of a second discharge valve to substitute for nozzle 15 may assist in alleviating this problem. Still further, better control may be achieved by providing a second, or alternative, discharge valve which, for example, allows discharge to atmosphere of the pressurised gases upon detection of stop switch activation or engine speed falling below a predetermined value. In this way, the pressure or piston position monitoring system described above may be avoided.

If this embodiment is to be adopted, a simple solenoid valve triggered to open when stopping of the engine is detected, for example on flagging by the ECU of stop switch activation, may be adopted as the discharge valve. Although only small amounts of fuel, hydrocarbons, $NO_x$ and other environmental controlled components may be present in the discharged gases, it may be desirable to pass the gases through a carbon canister or similar treatment unit prior to discharge to atmosphere. This can readily be allowed for in manufacture of the engine.

The use of a secondary power source is not precluded by the invention. Indeed, a secondary power source may act as a valuable safeguard device under conditions where sufficient gas discharge has failed to be achieved at the time the engine comes to a complete stop. The secondary power source, which may be a battery, may operate the discharge valve, whether being the nozzle 15 or a distinct discharge valve, after engine shutdown. Operation of the valve may occur in response to pressure in the gas chamber 10 remaining above a predetermined value, in which case a pressure sensor may be required.

The application of the present invention is not limited to a system having a gas chamber 10 of the type described above. It will be understood that back-pressure problems may arise from pressurised gases which access the fuel motoring and injection systems by whatever gas supply means. Therefore, the invention is also applicable to gas discharge in engines employing a fuel/gas rail as, for example, described in the applicant's U.S. Pat. No. 4,934,329, herein incorporated by reference. In this case, gas discharge from the gas duct of the rail may be conducted. Further, gas may be discharged from the compressor circuit of an engine employing a gas, usually air, compressor. The advantages achieved in terms of pressure reduction and alleviation of the back-pressure problems above described remain the same.

There will now be described, with reference to FIG. 2, a further engine as disclosed in the applicant's Australian Patent Application No. 28090/92 (which corresponds to U.S. Pat. No. 5,483,944) in which the present invention may be employed.

Figure 2:
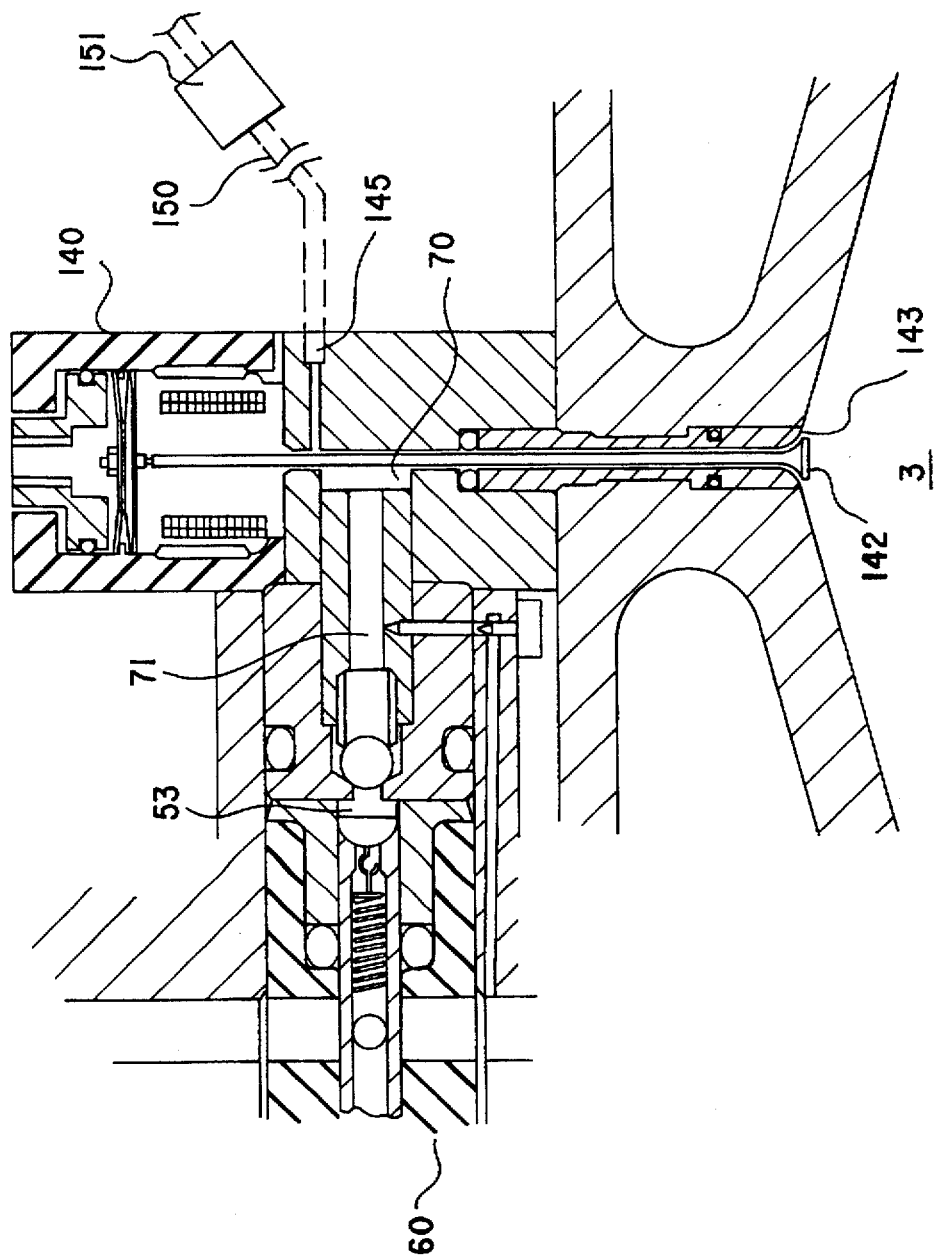
FIG. 2 is a similar cross-sectional view of an alternative construction of cylinder head.

The fuel injector 140 shown in FIG. 2 has an injector chamber 70 to receive the fuel delivered from a motoring chamber 53 through the passage 71 and also comprises a solenoid actuated valve 142 to control the timing of the delivery of the fuel from the injector chamber 70 to the engine combustion chamber. In operation, the injector chamber 70 is charged with gas derived from the engine combustion chamber 3 in a manner analogous to that above described, or from a suitable external source through a port as indicated at 145. The pressure of the gas is sufficient to effect delivery of the fuel when the valve 142 is open via the nozzle 143 to the engine combustion chamber against the compression pressure prevailing therein when the engine is running. Conversely, when the engine ceases to operate, the same gas pressure is a source of back-pressure and possible gas locks in the fuel metering system 60.

Thus, valve 142 may be opened under command of the ECU to enable gas to be discharged from the injection/motoring system prior to or shortly after the engine ceases to operate in the manner above described. Alternatively, pressure in the compressor circuit, which tends to cause back-pressure problems, may be relieved through a valve located in the compressor circuit (not shown).

It is to be understood that although the cylinder heads described above are designed for a two stroke cycle engine, the invention is equally applicable to four stroke cycle engines. In this regard, it is to be appreciated that the discharge of gas will typically need to occur when the pressure within the cylinder is a minimum which will be during the induction stroke just after TDC. Also, it is to be understood that the gas can be air or any other gas, the gas typically being a gas used in combustion, and the gas may participate and assist in the overall combustion process as air does. Also, the fuel may be in a liquid, vapour of gaseous form. Finally, the engine may be an automotive, aircraft or marine engine and may operate on the diesel cycle.

The above description is provided for the purposes of exemplification of the invention. Modifications and variations to the embodiments of the invention described above may be made by persons skilled in the art reading the disclosure which remain within the scope of the invention.

I claim:

1. An internal combustion engine having at least one combustion chamber; a fuel injector means associated with the combustion chamber; fuel metering means to meter fuel for delivery by the fuel injector means; gas supply means in communication with the fuel injector means to supply gas thereto whereby fuel is delivered from the fuel injector means entrained in the gas; and pressure reduction means to reduce the pressure in said gas supply means prior to the stopping of the engine operable in response to at least one predetermined engine operating condition indicating imminent cessation of engine operation.

2. The engine of claim 1 wherein the actuation of a stop switch is the predetermined engine operating condition indicating cessation of engine operation.

3. The engine of claim 1 wherein said fuel metering means meters fuel through a fuel supply means to said fuel injector means and said gas supply means is in communication with said fuel supply means and with said fuel injector means.

4. The engine of claim 1 including means for operating said pressure reduction means when said at least one predetermined engine operating condition is engine speed falling below a predetermined value.

5. The engine of claim 1 wherein the engine is a direct injection engine and said pressure reduction means is comprised in part of said fuel injector means.

6. The engine of claim 5 wherein said pressure reduction means is a valve comprised in part of said fuel injector.

7. The engine of claim 1 wherein said gas supply means is selected from the group consisting of a chamber, reservoir and plenum associated with said combustion chamber.

8. The engine of claim 1 wherein said gas supply means is a gas supply duct in a fuel/gas rail.

9. The engine of claim 1 including means to operate said pressure reduction means when the piston of the engine is in a predetermined position.

10. The engine of claim 5 wherein said pressure reduction means is a valve separate from said fuel injector means.

11. The engine of claim 1 further including means to separate fuel from gas discharged by said pressure reduction means.

12. The engine of claim 1 wherein said gas chamber is adjacent said combustion chamber.

13. The engine of claim 1 wherein said gas supply means is a chamber and said pressure reduction means is a valve not comprised in said fuel injector means.

14. A method for reducing pressure in a gas supply means of an internal combustion engine comprising at least one combustion chamber; a fuel injector means associated with the combustion chamber; fuel metering means to meter fuel for delivery by the fuel injector means; the gas supply means being in communication with the fuel injector means whereby fuel is delivered from the fuel injector means entrained in the gas; the method including reducing the pressure in said gas supply means with a pressure reduction means prior to the stopping of the engine in response to at least one predetermined engine operating condition indicating imminent cessation of engine operation.

15. The method of claim 14, wherein the actuation of a stop switch is the predetermined engine operating condition indicating cessation of engine operation.

16. The method of claim 14 wherein said fuel metering means meters fuel through a fuel supply means to said fuel injector means and wherein said gas supply means is in communication with said fuel supply means and with said fuel injector means.

17. The method of claim 14 wherein said pressure reduction means is operated when said at least one predetermined engine operating condition is engine speed falling below a predetermined value.

18. The method of claim 14 wherein said pressure reduction means is a valve communicating said gas supply means with a zone of lower pressure.

19. The method of claim 18 wherein said zone of lower pressure is a combustion chamber of the engine.

20. The method of claim 14 wherein said pressure reduction means is comprised in part of said fuel injector means.

21. The method of claim 18 wherein said pressure reduction means include a valve comprising part of said fuel injection means.

22. The method of claim 18 wherein said pressure reduction means includes a valve separate from said fuel injection means.

23. The method of claim 14 wherein said pressure reduction means is operated when a piston of the engine is in a predetermined position.

24. The method of claim 14 wherein fuel is separated from gas discharged by said pressure reduction means.

25. The method of claim 14 wherein said pressure reduction means is operated over a predetermined number of engine cycles following sensing of said predetermined engine operating condition.

26. The method of claim 14 wherein said pressure reduction means is operated over a predetermined time following sensing of said predetermined engine operating condition.

* * * * *